US012695571B2

(12) United States Patent
Pick et al.

(10) Patent No.: US 12,695,571 B2
(45) Date of Patent: Jul. 28, 2026

(54) CHANNEL AWARE DEMODULATION REFERENCE SIGNAL

(71) Applicant: QUALCOMM Incorporated, San Diego, CA (US)

(72) Inventors: Jacob Pick, Mevaseret Zion (IL); Shay Landis, Hod Hasharon (IL); Peer Berger, Hod Hasharon (IL); Tomer Geva, Kiryat Ono (IL)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 18/499,867

(22) Filed: Nov. 1, 2023

(65) Prior Publication Data

US 2025/0141623 A1 May 1, 2025

(51) Int. Cl.
*H04L 5/00* (2006.01)
*H04W 72/0446* (2023.01)
*H04W 72/0453* (2023.01)

(52) U.S. Cl.
CPC ....... *H04L 5/0051* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 12,047,981 | B2 * | 7/2024 | Lin | ....................... H04W 72/53 |
| 2016/0006550 | A1 | 1/2016 | Cheng et al. | |
| 2018/0131490 | A1 | 5/2018 | Patel et al. | |
| 2019/0013917 | A1 * | 1/2019 | Nam | ...................... H04L 5/0053 |
| 2022/0224481 | A1 * | 7/2022 | Yu | .......................... H04L 5/0094 |
| 2022/0385420 | A1 | 12/2022 | Dallal et al. | |
| 2023/0275715 | A1 | 8/2023 | Paz et al. | |

OTHER PUBLICATIONS

International Search Report and Written Opinion—PCT/US2024/045042—ISA/EPO—Nov. 11, 2024.

* cited by examiner

*Primary Examiner* — Anh Ngoc M Nguyen
(74) *Attorney, Agent, or Firm* — Patterson & Sheridan LLP

(57) ABSTRACT

Certain aspects of the present disclosure provide techniques for channel aware demodulation reference signals (DMRS). An example method, performed at a user equipment (UE), generally includes receiving a message indicating one or more parameters for dynamic DMRS resource allocation, and communicating during one or more periods using DMRS resources dynamically allocated for the one or more periods based on the one or more parameters.

15 Claims, 13 Drawing Sheets

800

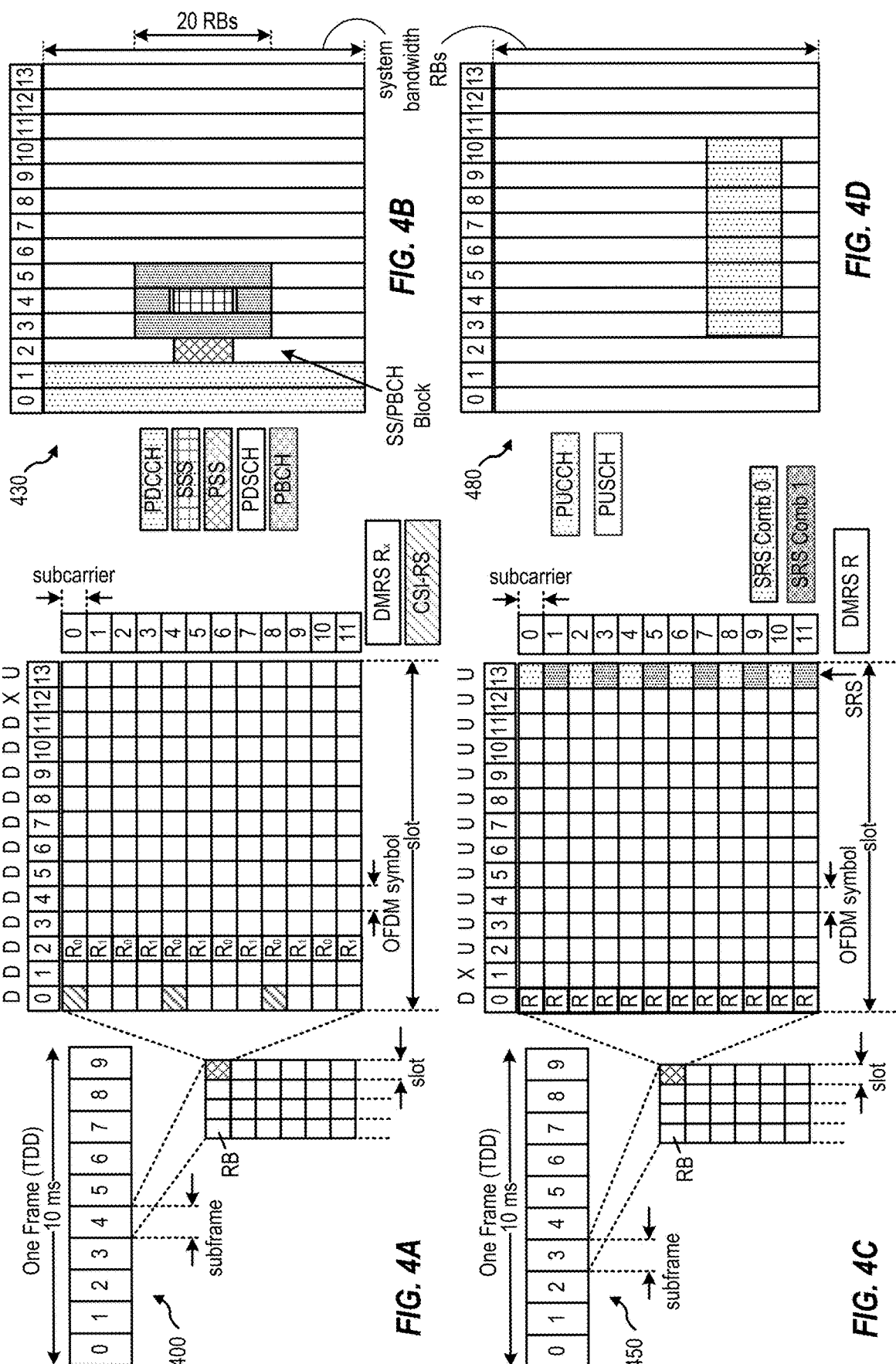

500

550

800

900

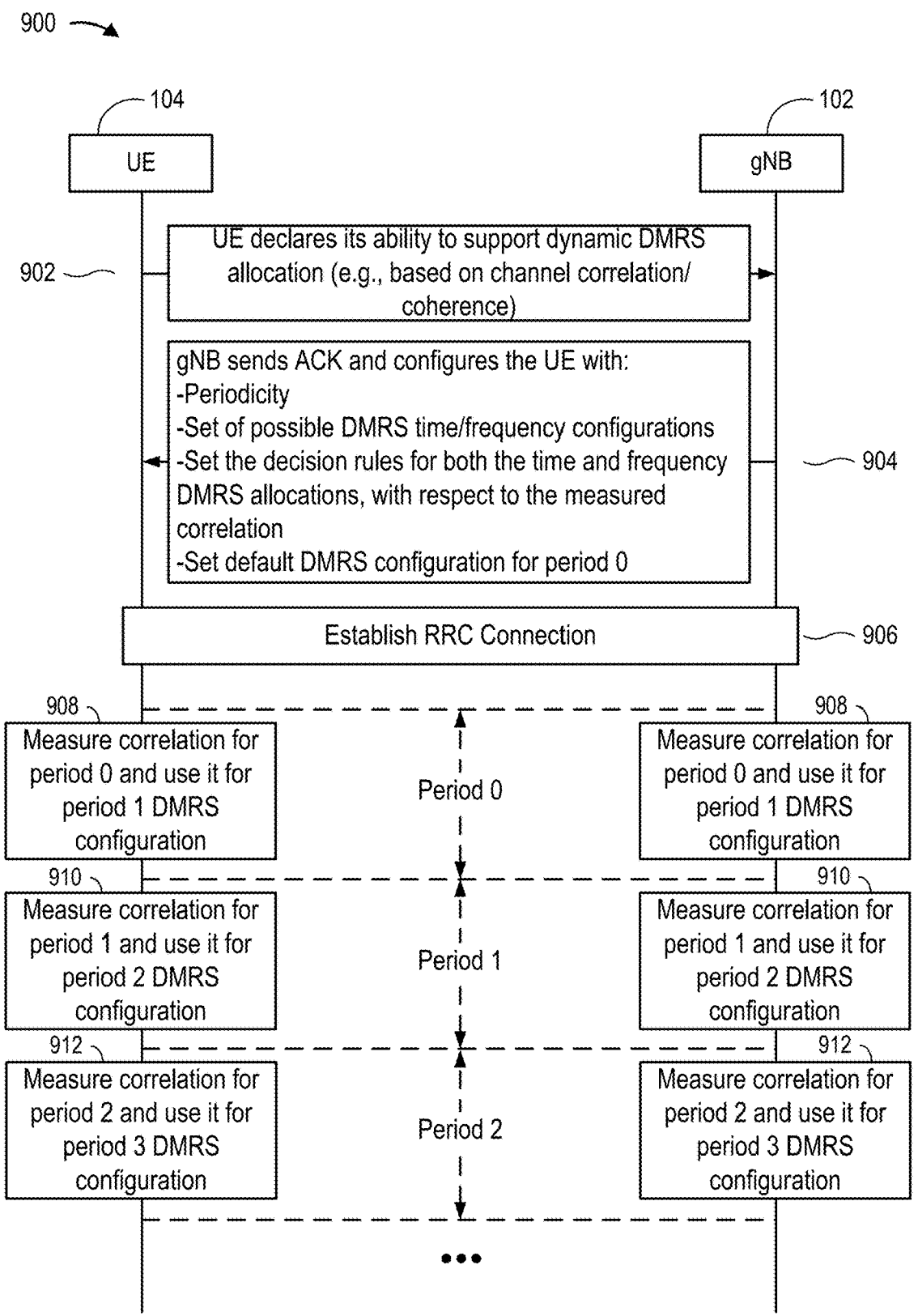

104
UE 102
gNB

902
UE declares its ability to support dynamic DMRS allocation (e.g., based on channel correlation/ coherence)

904
gNB sends ACK and configures the UE with:
-Periodicity
-Set of possible DMRS time/frequency configurations
-Set the decision rules for both the time and frequency DMRS allocations, with respect to the measured correlation
-Set default DMRS configuration for period 0

906
Establish RRC Connection

908
Measure correlation for period 0 and use it for period 1 DMRS configuration

908
Measure correlation for period 0 and use it for period 1 DMRS configuration

Period 0

910
Measure correlation for period 1 and use it for period 2 DMRS configuration

910
Measure correlation for period 1 and use it for period 2 DMRS configuration

Period 1

912
Measure correlation for period 2 and use it for period 3 DMRS configuration

912
Measure correlation for period 2 and use it for period 3 DMRS configuration

Period 2

A method for wireless communication at a user equipment (UE)

Receive a message indicating one or more parameters for dynamic DMRS resource allocation; and

1105

Communicate during one or more periods using DMRS resources dynamically allocated for the one or more periods based on the one or more parameters.

1110

1100

A method for wireless communication at a network entity

Transmit a message indicating one or more parameters for dynamic DMRS resource allocation; and
— 1205

Communicate, with a user equipment (UE), during one or more periods using DMRS resources dynamically allocated for the one or more periods based on the one or more parameters.
— 1210

1200

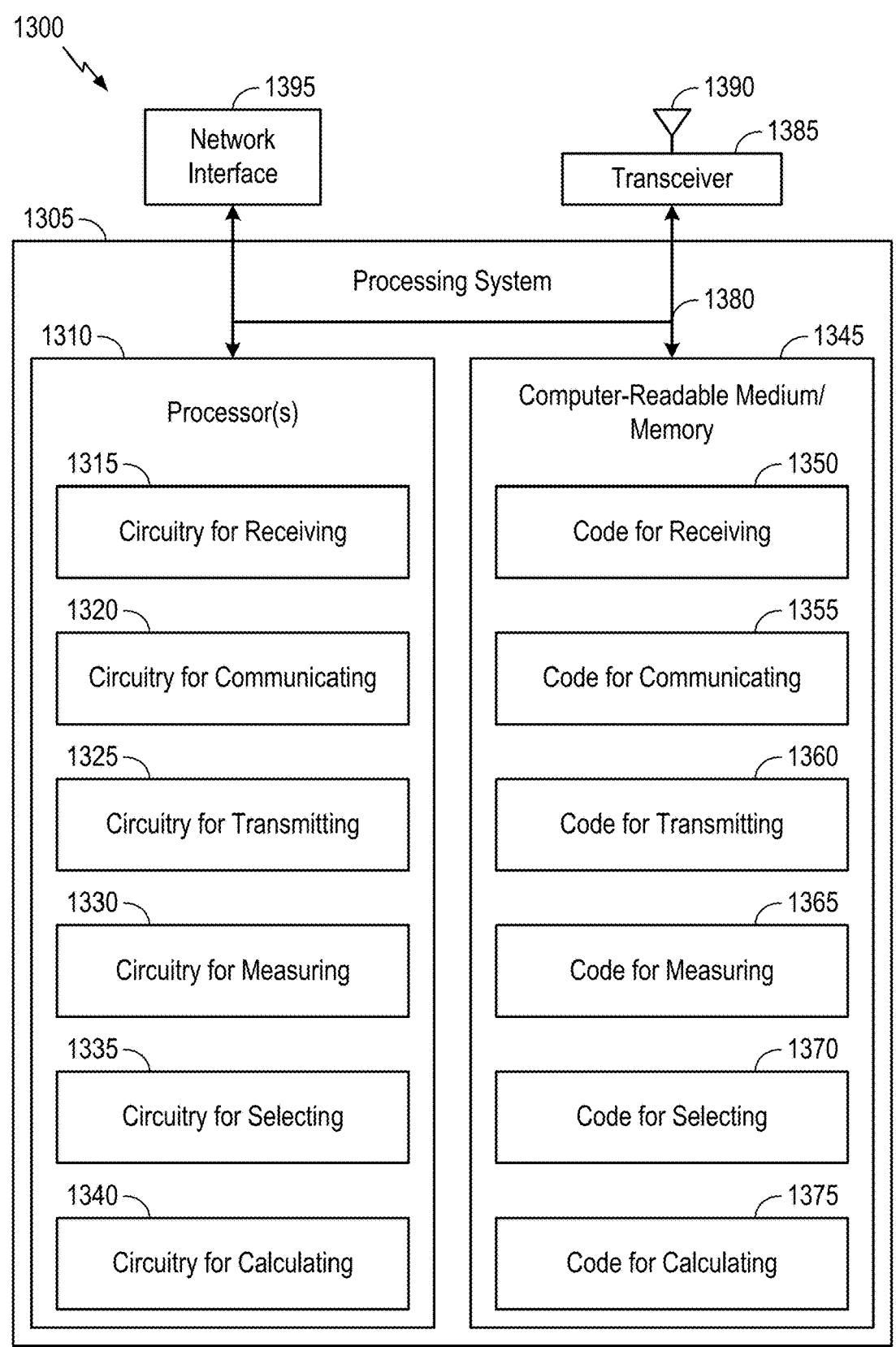

1300

1395
Network Interface

1390

1385
Transceiver

1305

Processing System

1380

1310
Processor(s)

1345
Computer-Readable Medium/ Memory

1315
Circuitry for Receiving

1350
Code for Receiving

1320
Circuitry for Communicating

1355
Code for Communicating

1325
Circuitry for Transmitting

1360
Code for Transmitting

1330
Circuitry for Measuring

1365
Code for Measuring

1335
Circuitry for Selecting

1370
Code for Selecting

1340
Circuitry for Calculating

1375
Code for Calculating

FIG. 13

CHANNEL AWARE DEMODULATION REFERENCE SIGNAL

BACKGROUND

Field of the Disclosure

Aspects of the present disclosure relate to wireless communications, and more particularly, to techniques for updating demodulation reference signal (DMRS) resources based on channel conditions.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication at a user equipment (UE). The method includes receiving a message indicating one or more parameters for dynamic DMRS resource allocation; and communicating during one or more periods using DMRS resources dynamically allocated for the one or more periods based on the one or more parameters.

Another aspect provides a method for wireless communication at a network entity. The method includes transmitting a message indicating one or more parameters for dynamic DMRS resource allocation; and communicating, with a user equipment (UE), during one or more periods using DMRS resources dynamically allocated for the one or more periods based on the one or more parameters.

Other aspects provide: an apparatus operable, configured, or otherwise adapted to perform any one or more of the aforementioned methods and/or those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIG. 9 depicts a call flow diagram illustrating channel aware DMRS, in accordance with certain aspects of the present disclosure.

FIG. 13 depicts aspects of an example communications device.

DETAILED DESCRIPTION

Figure 1:
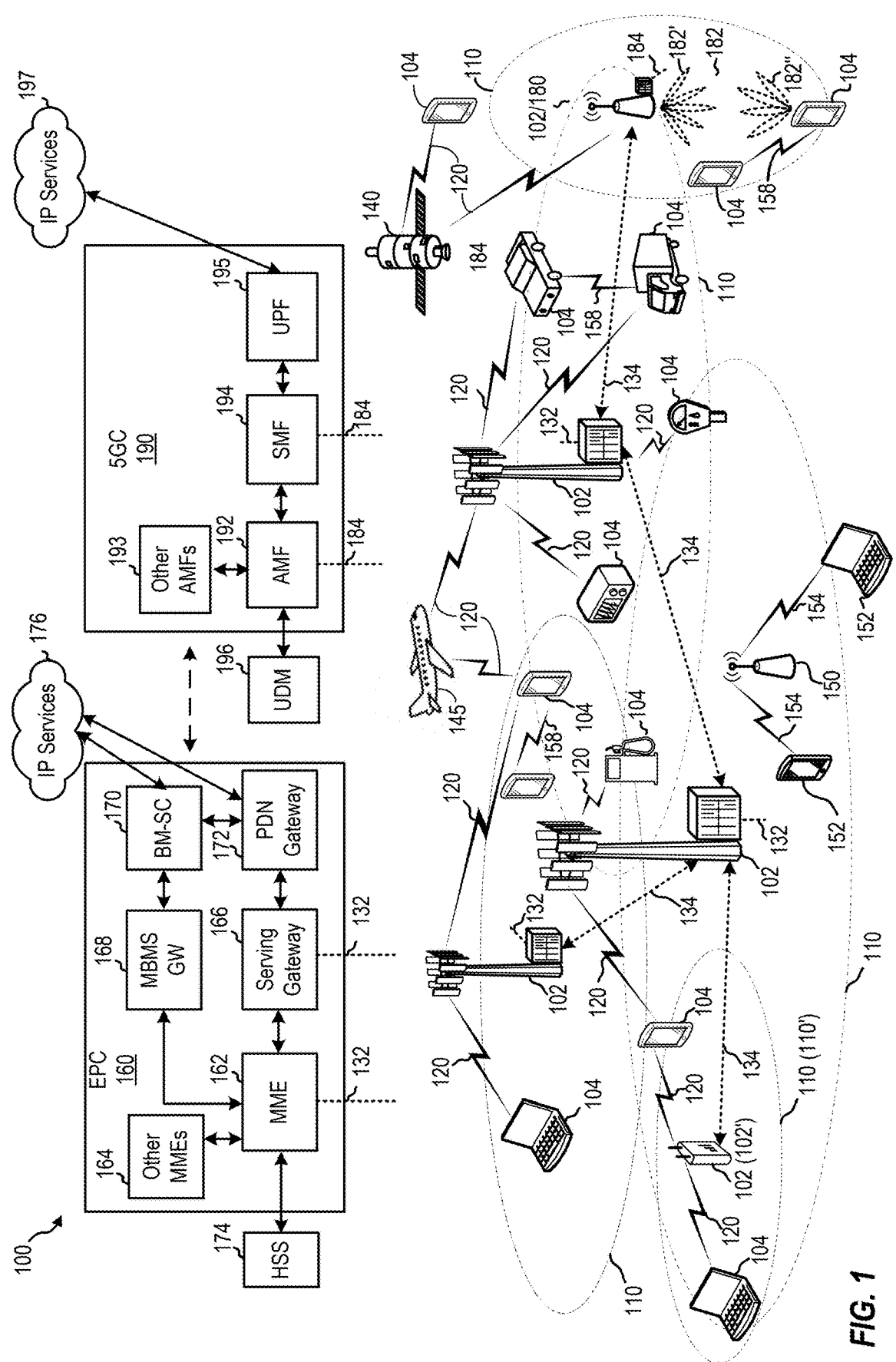
FIG. 1 depicts an example wireless communications network.

Aspects of the present disclosure provide apparatuses, methods, processing systems, and computer-readable mediums for updating demodulation reference signal (DMRS) resources based on channel conditions.

Demodulation Reference Signals (DMRS) are specific signals in wireless communication used for channel estimation and demodulation. They assist in recovering transmitted data accurately by providing a reference for the receiver. DMRS are typically known to both the transmitter and receiver, making it easier to extract the information from the received signal and improve overall communication reliability.

Physical Downlink Shared Channel (PDSCH) DMRS, for example, generally refers to a downlink reference signal used for channel estimation and data demodulation by a user equipment (UE). The DMRS may help the UE determine the channel characteristics to aid in correctly decoding data transmitted on the PDSCH.

PDSCH DMRS consists of a specific sequence of reference symbols (DMRS symbols). These symbols are inserted into the PDSCH resource elements (REs) at predetermined locations. The structure of PDSCH DMRS includes time-domain and frequency-domain configurations. In the time domain, PDSCH DMRS symbols are distributed across time slots, with particular positions determined based on cell-specific and UE-specific parameters. These symbols are used for time-domain channel estimation. In the frequency domain, PDSCH DMRS symbols are mapped to specific resource blocks (RBs) following a predefined pattern. These symbols are used for frequency-domain channel estimation.

However, DMRS RE locations are typically static and do not change, regardless of channel conditions. For example, DMRS RE locations may be configured via radio resource control (RRC) signaling and not change unless an RRC reconfiguration occurs. This may result in sub-optimal DMRS resource allocation when channel conditions change over time or frequency. For example, higher Doppler scenarios may benefit from denser DMRS over time, while lower Doppler scenarios may allow sparser DMRS over time. Additionally, larger delay spread may result in a frequency selective channel that may benefit from denser DMRS over frequency, while lower delay spread may allow sparser DMRS over frequency.

Aspects of the present disclosure provide techniques for dynamic, channel aware DMRS resource configuration/allocation (e.g., time and frequency resolution of DMRS). In this context, dynamic refers to the ability to change DMRS resource allocation without an RRC configuration. The changes may be based on changing channel conditions, for example, as indicated by changes in average time and frequency correlation across measurement period.

Such techniques may be useful, for example, when a network entity (e.g., a gNB) and a UE have knowledge of the channel and thus may derive the time and frequency correlation, reflecting the time and frequency coherence. According to certain aspects, the DMRS configuration/allocation may be based on AI/ML models (e.g., neural networks (NN)) which may be (pre) configured by the gNB. Using AI/ML models in this manner may allow for more dynamic change of the DMRS allocation/configuration per time (e.g., slot) and frequency (e.g., RB).

Utilization of the techniques disclosed herein may allow for matching of DMRS density to the channel conditions/coherence, which may improve capacity and coverage by improving channel estimation (e.g., at too low fixed DMRS allocation density) and increasing throughput (e.g., at too high fixed DMRS allocation density, where excessive DMRS may be replaced by data REs).

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
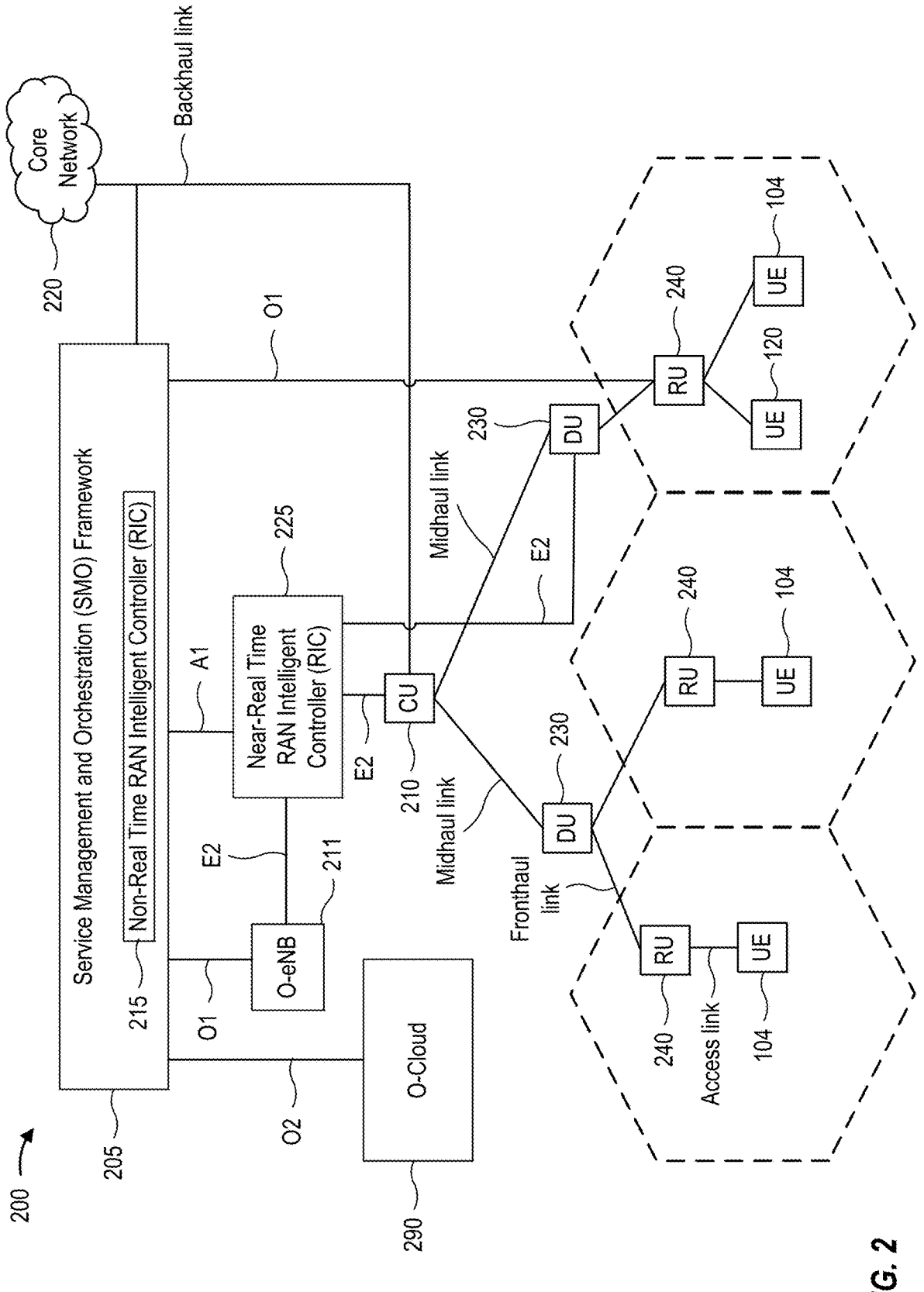
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
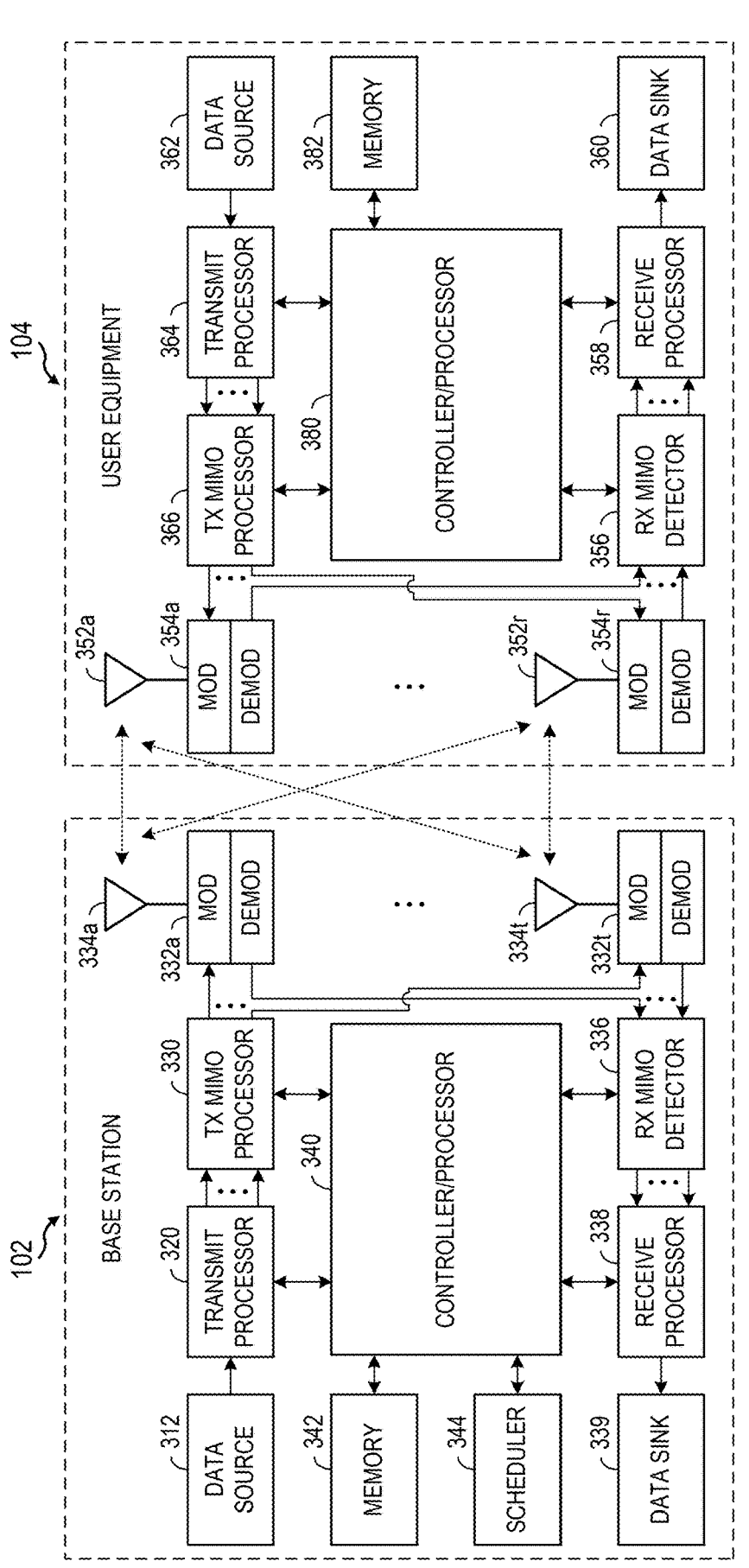
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^μ×15$ kHz, where μ is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Demodulation Reference Signal (DMRS) Symbol Patterns

As noted above, PDSCH DMRS consists of a specific sequence of reference symbols (DMRS symbols). These symbols are inserted into the PDSCH resource elements (REs) at predetermined locations. The structure of PDSCH DMRS includes time-domain and frequency-domain configurations.

In the time domain, PDSCH DMRS symbols are distributed across time slots, with particular positions determined based on cell-specific and UE-specific parameters. These symbols are used for time-domain channel estimation. In the frequency domain, PDSCH DMRS symbols are mapped to specific resource blocks (RBs) following a predefined pattern. These symbols are used for frequency-domain channel estimation.

Figure 5A:
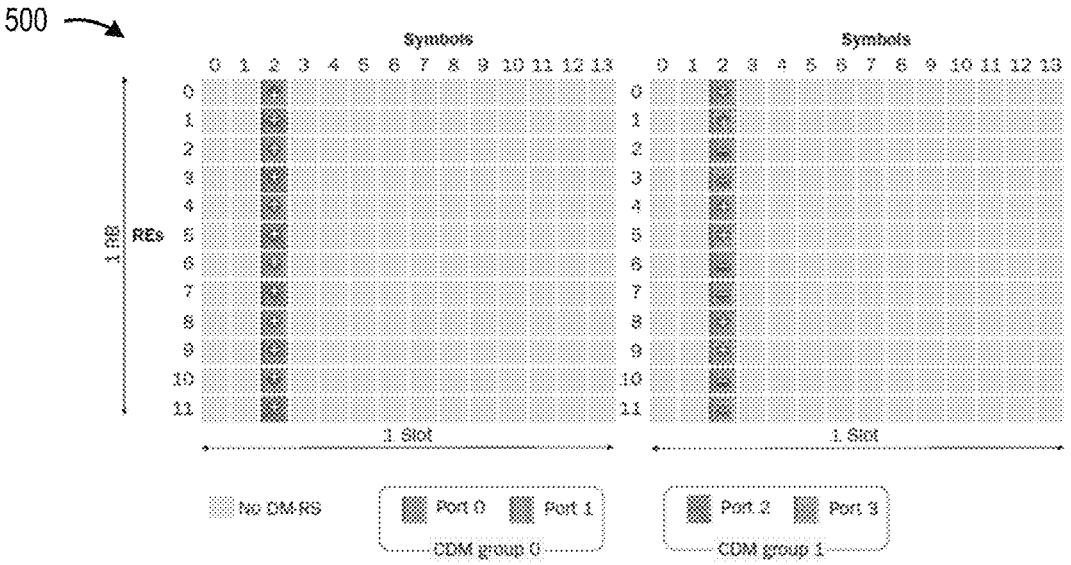
FIGS. 5A and 5B depict example diagrams illustrating single and double demodulation reference signal (DMRS) symbols for physical downlink shared channel (PDSCH) DMRS type 1.
Figure 5B:
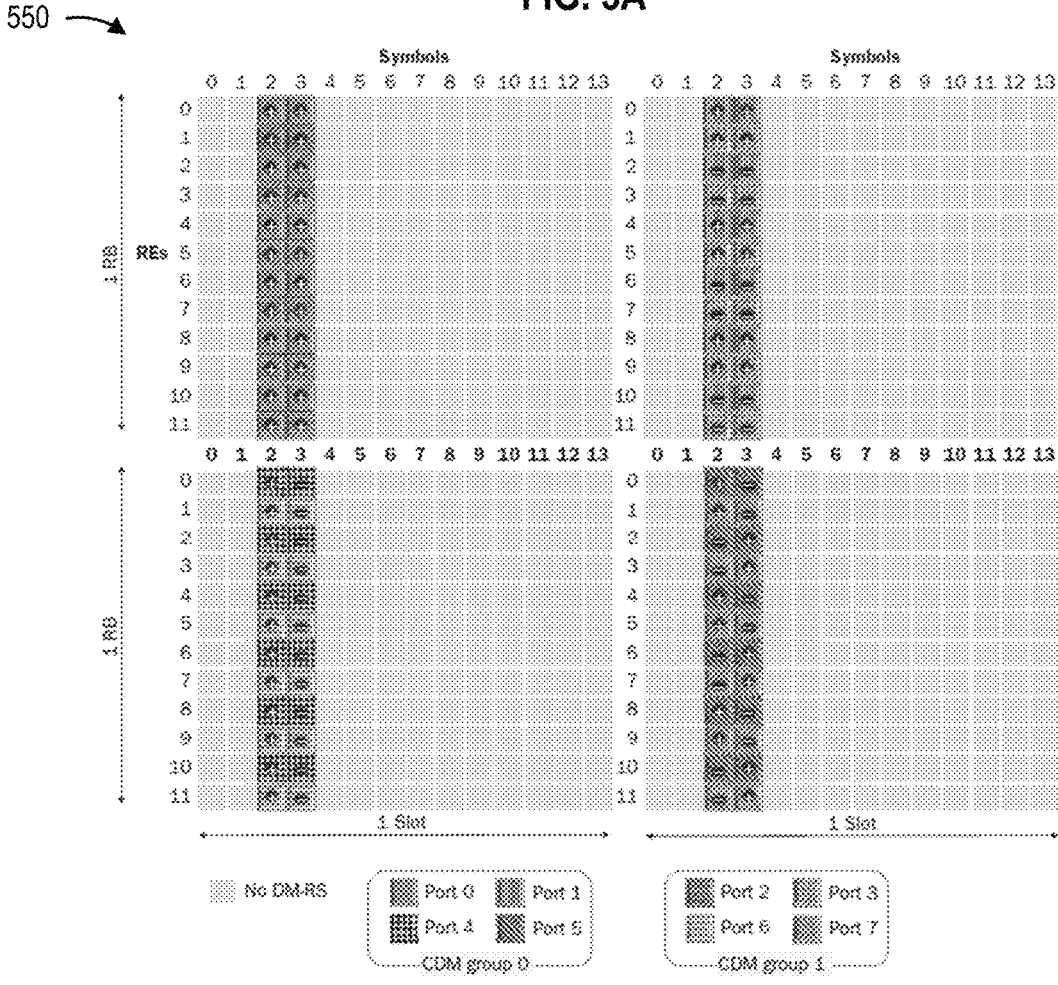
Figure 6A:
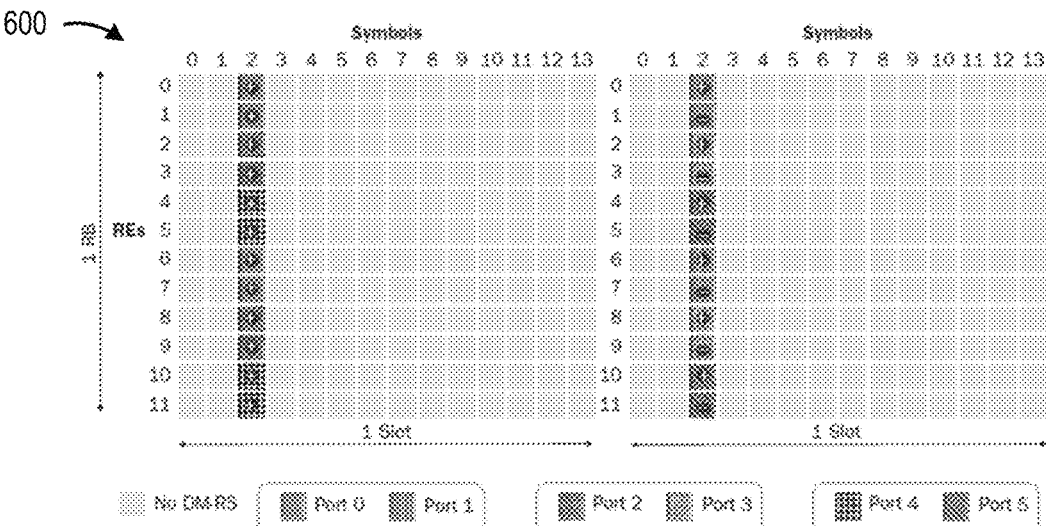
FIGS. 6A and 6B depict example diagrams illustrating single and double DMRS symbols for PDSCH DMRS type 2.
Figure 6B:
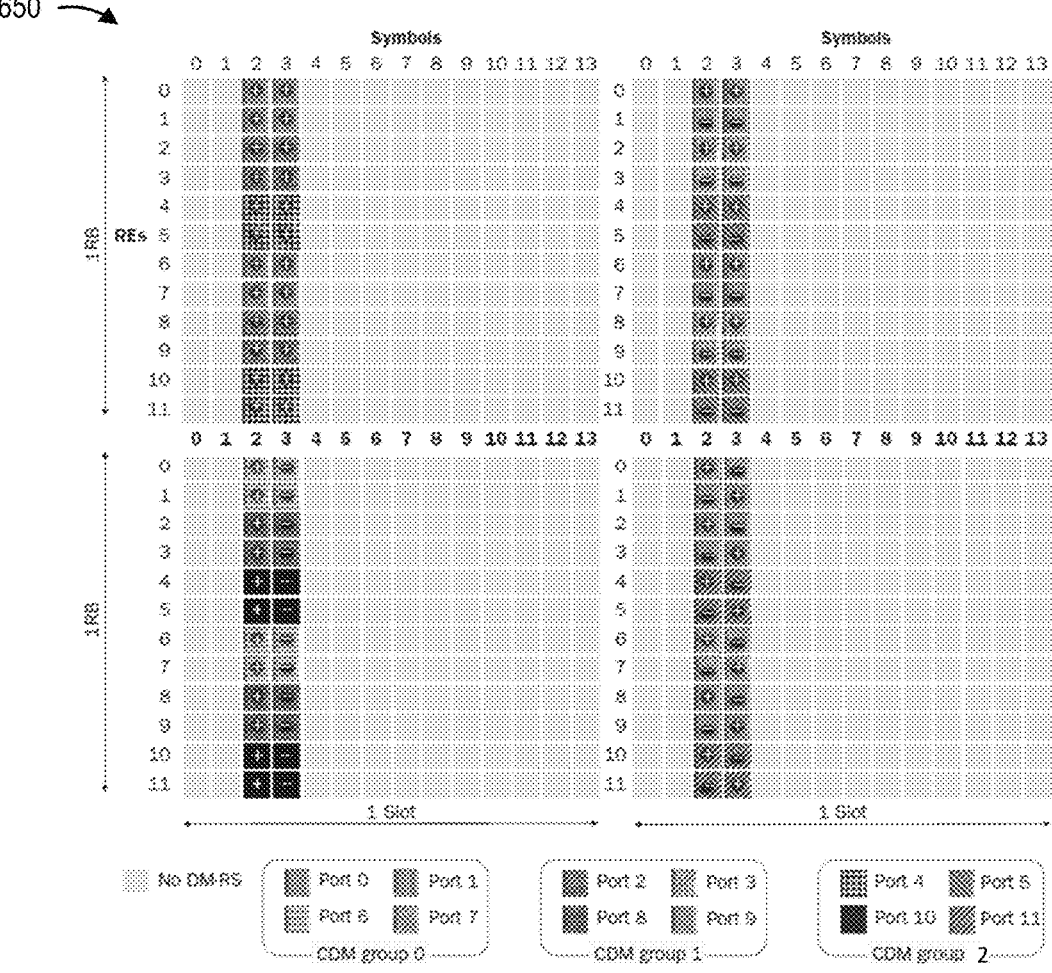

There are different PDSCH DMRS configuration types, referred to as Type 1 and Type 2. FIGS. 5A and 5B depict example diagrams 500 and 550 illustrating single and double DMRS symbol patterns, respectively, for Type 1 PDSCH DMRS. FIGS. 6A and 6B depict example diagrams 600 and 650 illustrating single and double DMRS symbol patterns, respectively, for Type 2 PDSCH DMRS.

As can be seen, the configuration type changes the location pattern in frequency domain. Code division multiplexing (CDM) may be used to group DMRS ports into different CDM groups.

In the examples shown in diagram 500 of FIG. 5A that supports 4 DMRS ports, DMRS ports 0 and 1 are in CDM group 0, while DMRS ports 2 and 3 are in CDM group 1. In the double-symbol example shown in diagram 550 of FIG. 5B that supports 8 DMRS ports, DMRS ports 0, 1, 4, and 5 are in CDM group 0, while DMRS ports 2, 3, 6, and 7 are in CDM group 1.

In the examples shown in diagram 600 of FIG. 6A that supports 6 DMRS ports, DMRS ports 0 and 1 are in CDM group 0, DMRS ports 2 and 3 are in CDM group 1, and DMRS ports 4 and 5 are in CDM group 2. In the double-symbol example shown in diagram 650 of FIG. 6B that supports 12 DMRS ports, DMRS ports 0, 1, 6, and 7 are in CDM group 0, DMRS ports 2, 3, 8, and 9 are in CDM group 1, and DMRS ports 4, 5, 10, and 11 are in CDM group 2.

Example Framework for AI/ML in a Radio Access Network

Figure 7:
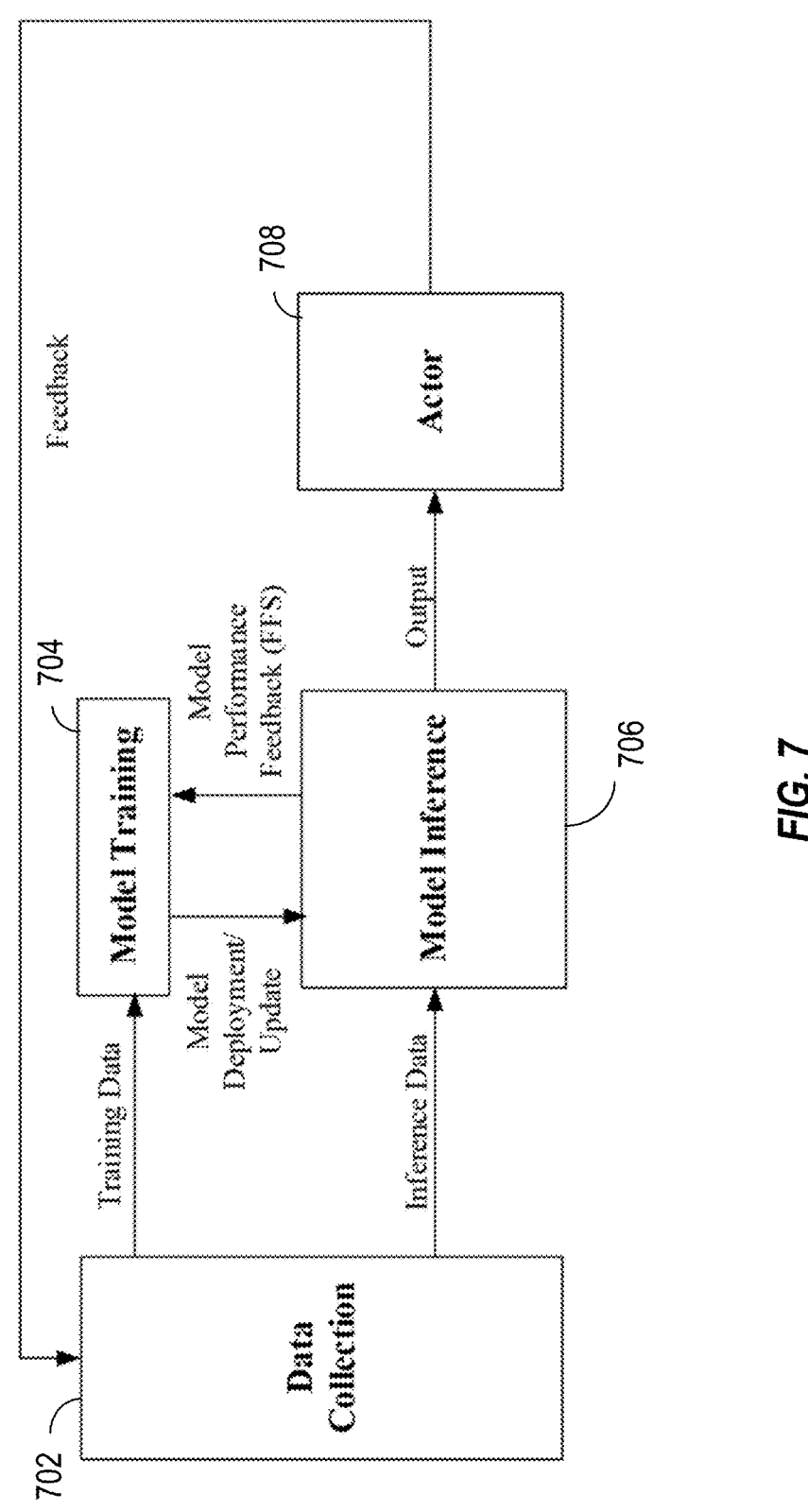
FIG. 7 illustrates a general functional framework applied for artificial intelligence (AI)-enabled RAN intelligence.

FIG. 7 depicts an example of AI/ML functional framework 700 for RAN intelligence, in which aspects described herein may be implemented.

The AI/ML functional framework includes a data collection function 702, a model training function 704, a model inference function 706, and an actor function 708, which interoperate to provide a platform for collaboratively applying AI/ML to various procedures in RAN.

The data collection function 702 generally provides input data to the model training function 704 and the model inference function 706. AI/ML algorithm specific data preparation (e.g., data pre-processing and cleaning, formatting, and transformation) may not be carried out in the data collection function 702.

Examples of input data to the data collection function 702 (or other functions) may include measurements from UEs or different network entities, feedback from the actor function, and output from an AI/ML model. In some cases, analysis of data needed at the model training function 704 and the model inference function 706 may be performed at the data collection function 702. As illustrated, the data collection function 702 may deliver training data to the model training function 704 and inference data to the model inference function 706.

The model training function 704 may perform AI/ML model training, validation, and testing, which may generate model performance metrics as part of the model testing procedure. The model training function 704 may also be responsible for data preparation (e.g., data pre-processing and cleaning, formatting, and transformation) based on the training data delivered by the data collection function 702, if required.

The model training function 704 may provide model deployment/update data to the Model interface function 706. The model deployment/update data may be used to initially deploy a trained, validated, and tested AI/ML model to the model inference function 706 or to deliver an updated model to the model inference function 706.

As illustrated, the model inference function 706 may provide AI/ML model inference output (e.g., predictions or decisions) to the actor function 708 and may also provide model performance feedback to the model training function 704, at times. The model inference function 706 may also be responsible for data preparation (e.g., data pre-processing and cleaning, formatting, and transformation) based on inference data delivered by the data collection function 702, at times.

The inference output of the AI/ML model may be produced by the model inference function 706. Specific details of this output may be specific in terms of use cases. The model performance feedback may be used for monitoring the performance of the AI/ML model, at times. In some cases, the model performance feedback may be delivered to the model training function 704, for example, if certain information derived from the model inference function is suitable for improvement of the AI/ML model trained in the model training function 704.

The model inference function 706 may signal the outputs of the model to nodes that have requested them (e.g., via subscription), or nodes that take actions based on the output from the model inference function. An AI/ML model used in a model inference function 706 may need to be initially trained, validated and tested by a model training function before deployment. The model training function 704 and model inference function 706 may be able to request specific information to be used to train or execute the AI/ML algorithm and to avoid reception of unnecessary information. The nature of such information may depend on the use case and on the AI/ML algorithm.

The actor function 708 may receive the output from the model inference function 706, which may trigger or perform corresponding actions. The actor function 708 may trigger actions directed to other entities or to itself. The feedback generated by the actor function 708 may provide information used to derive training data, inference data or to monitor the performance of the AI/ML Model. As noted above, input data for a data collection function 702 may include this feedback from the actor function 708. The feedback from the actor function 708 or other network entities (e.g., via Data Collection function) may also be used at the model inference function 706.

The AI/ML functional framework 700 may be deployed in various RAN intelligence-based use cases. Such use cases may include CSI feedback enhancement, enhanced beam management (BM), positioning and location (Pos-Loc) accuracy enhancement, and various other use cases.

Aspects Related to Channel Aware DMRS

Aspects of the present disclosure provide techniques for dynamic, channel aware DMRS resource allocation.

As noted above, DMRS RE locations are typically static and do not change, regardless of channel conditions. This may result in sub-optimal DMRS resource allocation when channel conditions change over time or frequency.

For example, higher Doppler scenarios may benefit from denser DMRS over time, while lower Doppler scenarios may allow sparser DMRS over time. Additionally, larger delay spread may result in a frequency selective channel that may benefit from denser DMRS over frequency, while lower delay spread may allow sparser DMRS over frequency.

The techniques for channel aware DMRS resource allocation proposed herein may be useful, for example, when a network entity (e.g., a gNB) and a UE have knowledge of the channel and thus may derive the time and frequency correlation, reflecting the time and frequency coherence.

As will be described in greater detail below, according to certain aspects, the DMRS configuration/allocation may be based on AI/ML models (e.g., neural networks (NN)) which may be (pre) configured by the gNB. Using AI/ML models in this manner may allow for more dynamic change of the DMRS allocation/configuration per time (e.g., slot) and frequency (e.g., RB).

Figure 8:
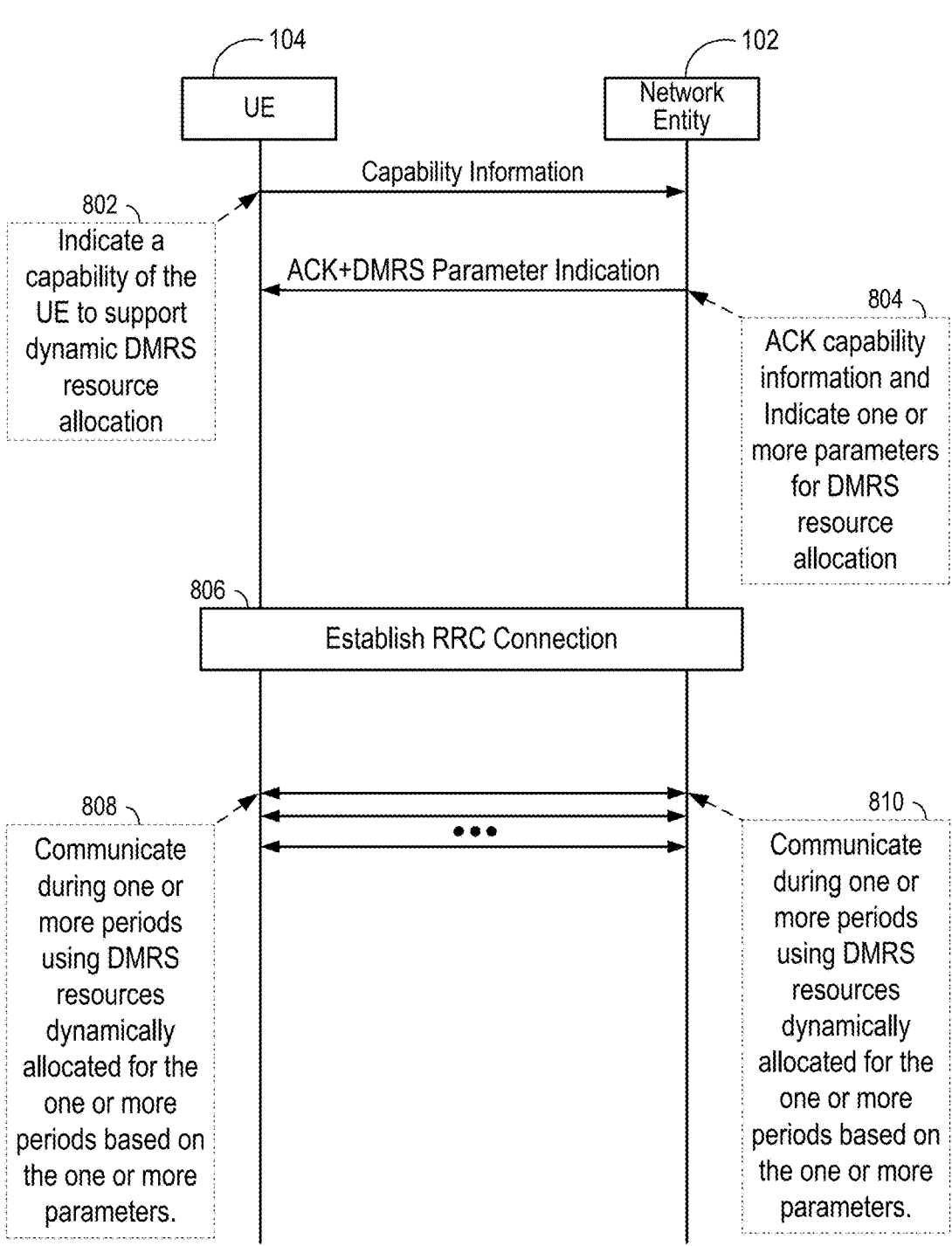
FIG. 8 depicts a call flow diagram illustrating channel aware DMRS, in accordance with certain aspects of the present disclosure.
Figure 10:
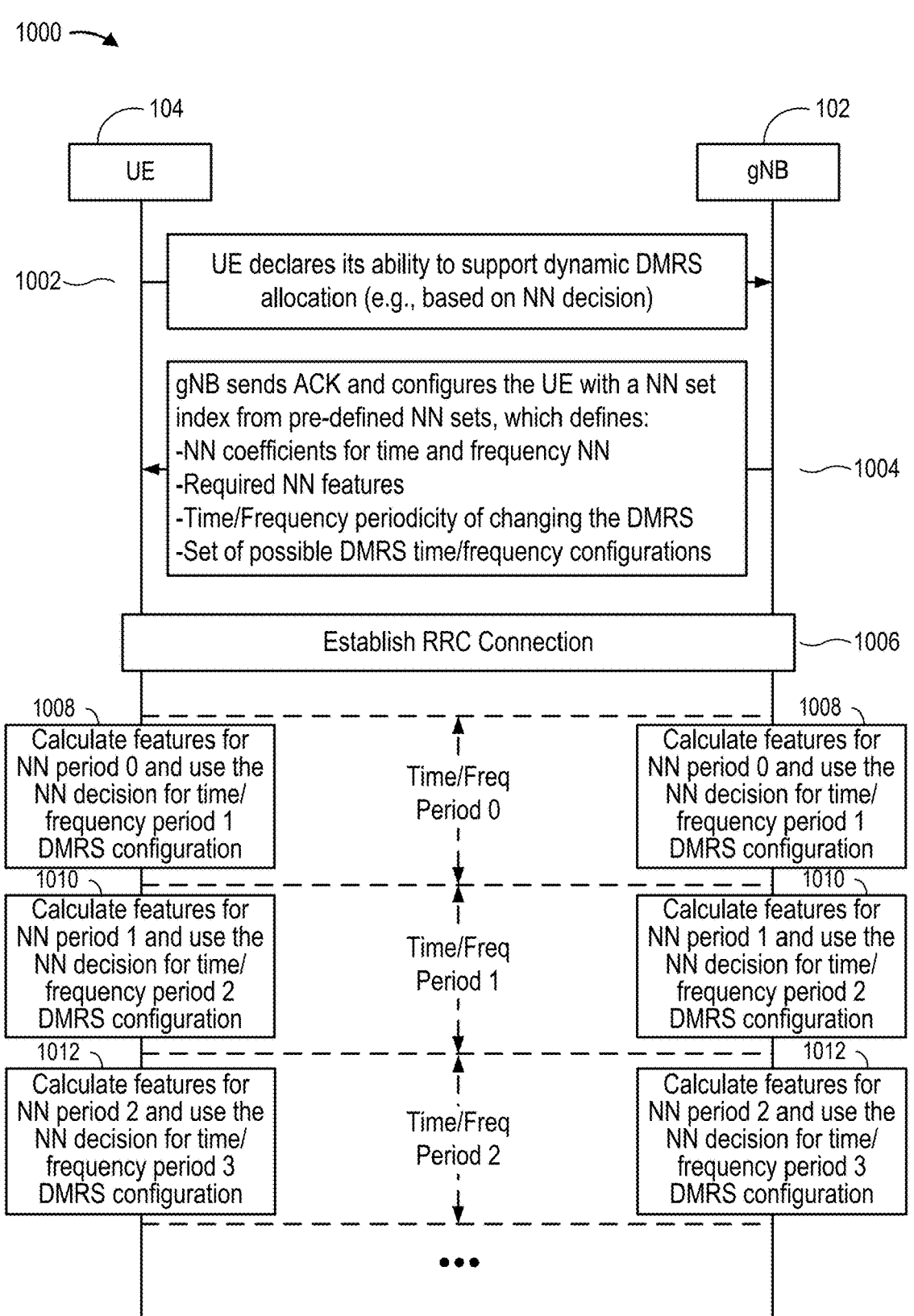
FIG. 10 depicts a call flow diagram illustrating machine learning (ML)-based channel aware DMRS, in accordance with certain aspects of the present disclosure.

These techniques may be understood with reference to FIG. 8, which depicts a call flow diagram 800 illustrating channel aware DMRS, in accordance with certain aspects of the present disclosure. In some aspects, the UE shown in FIG. 8 (and/or FIGS. 9-10) may be an example of the UE 104 depicted and described with respect to FIGS. 1 and 3. In some aspects, the network entity shown in FIG. 8 (and/or FIGS. 9-10) may be an example of the BS 102 (e.g., a gNB) depicted and described with respect to FIGS. 1 and 3 or a disaggregated base station depicted and described with respect to FIG. 2.

As illustrated at 802, the UE may indicate its capability to support dynamic DMRS resource allocation. For example, the indication may be provided via uplink control information (UCI).

As illustrated at 804, the network entity may acknowledge (ACK) the indicated capability information. In some cases, with the ACK or separately, the network entity may indicate one or more parameters for DMRS resource allocation.

According to certain aspects, the exchange of capability information, ACK, and parameters for DMRS resource allocation may be exchanged before the UE and the network entity establish an RRC connection, at 806.

As illustrated at 808 and 810 respectively, the UE and the network entity may communicate during one or more periods using DMRS resources dynamically allocated for the one or more periods based on the one or more parameters.

For example, by utilizing a same algorithm to dynamically allocate DMRS resources at both the UE and network entity, both sides may be in agreement on which resources are used to transmit DMRS on the transmit side (e.g., the network entity for PDSCH) and, therefore, which resources to monitor at the receive-side (e.g., the UE for PDSCH). As noted above, this channel aware DMRS may result in more accurate channel estimation, for example, by increasing DMRS density when channel conditions dictate. Channel aware DMRS may also result in more efficient resource utilization, by freeing up more REs for data transmission when channel conditions allow for less dense DMRS.

Aspects of the present disclosure provide for various options in how DMRS resources are adjusted based on channel conditions.

Aspects of the present disclosure provide a first option for channel aware DMRS (Option 1), where setting the DMRS density over time and frequency is based on channel correlation/coherence over time and/or frequency. Option 1 may be understood with reference to the call flow diagram 900 of FIG. 9.

As illustrated, the UE and the gNB may (e.g., prior to the RRC establishment phase) perform a handshake for dynamic DMRS allocation, similar to that described above with reference to FIG. 8.

For example, as illustrated at 902, the UE may declare its ability/capability to support dynamically adapted DMRS allocation (e.g., based on channel correlation/coherence or Option 1). As illustrated at 904, the gNB may acknowledge (ACK) the UE report and send a message indicating parameters to the UE, which may include (e.g., but are not limited to), a periodicity of the changing the DMRS (e.g., change the DMRS locations every x slots), a set of possible DMRS time configurations, a set of possible DMRS frequency configurations, decision rules for the time and/or frequency DMRS allocations with respect to the measured correlation, and a default DMRS configuration for a first period (Period 0).

As illustrated at 906, the UE and the gNB may establish an RRC connection.

The UE and the gNB may measure the average time and frequency correlation over the period at which the OFDM setting is constant. This measurement will be used for deciding on the DMRS configuration for the next period. For example, as illustrated at 908, the UE and the gNB may measure the average time and frequency correlation for Period 0, and may use the measurement for deciding on the DMRS configuration for Period 1 (e.g., according to the decision rules and/or other parameters).

Similarly, as illustrated at 910, the UE and the gNB may measure the average time and frequency correlation for Period 1, and may use the measurement for deciding on the DMRS configuration for Period 2. Similarly, as illustrated at 912, the UE and the gNB may measure the average time and frequency correlation for Period 2, and may use the measurement for deciding on the DMRS configuration for Period 3. This process of dynamic DMRS resource allocation/configuration may continue for a plurality of periods.

As noted above, the gNB may send a message indicating configuration information (e.g., parameters) for the UE for use in channel aware DMRS. For example, in some cases, these configuration information may include decision rules for the time and/or frequency DMRS configurations/allocations (e.g., relating to DMRS density) with respect to the measured time/frequency channel correlation/coherence.

An example of such decision rules, involving absolute values of the time/frequency correlations to obtain values ranging from 0 to 1, is outlined below. For time correlation (ct) measured (e.g., over 7 OFDM symbols):

IF ($ct>0.96$) THEN allocate one DMRS OFDM symbol in a slot;

IF ($0.96>=ct>0.80$) THEN allocate 2 DMRS OFDM symbols in a slot;

IF ($0.80>=ct>0.50$) THEN allocate 3 DMRS OFDM symbols in a slot; or

IF ($0.50>=ct$) THEN allocate 4 DMRS OFDM symbols in a slot.

For Frequency Correlation (cf) Measured (e.g., Over 12 Bins):

IF ($cf>0.96$) THEN allocate one DMRS per RB;

IF ($0.96>=cf>0.80$) THEN allocate 2 DMRS per RB; or

IF ($0.80>=cf$) THEN allocate 3 DMRS per RB.

Aspects of the present disclosure provide a second option (Option 2) for channel aware DMRS, where setting the DMRS density over time and frequency is AI/ML (e.g., NN) based. Option 2 may be understood with reference to the call flow diagram 1000 of FIG. 10.

As illustrated, the UE and the gNB may (e.g., prior to the RRC establishment phase) perform a handshake for dynamic DMRS allocation. For example, as illustrated at 1002, the UE may declare its ability/capability to support (e.g., Option 2 for NN-based) dynamically adapted DMRS allocation. In some cases, the capability information may indicate particular ML models (e.g., NNs) supported by the UE for channel aware DMRS.

As illustrated at 1004, the gNB may acknowledge (ACK) the UE report and send a message indicating parameters to the UE, which may include (e.g., but are not limited to), a NN set index identifying a time/frequency NN out of a plurality of possible pre-defined NN sets. The NN set index may define/indicate certain parameters which may include (e.g., but are not limited to) NN coefficients for the time/frequency NN, required NN features, a time and/or frequency periodicity of the changing the DMRS (e.g., change the DMRS locations every x slots any y RB), a set of possible DMRS time configurations, and a set of possible DMRS frequency configurations.

As illustrated at 1006, the UE and the gNB may establish an RRC connection.

The gNB and the UE may each calculate the NN input features and feed them to the time/frequency NN. For each time and frequency period (e.g., as defined by the gNB message), the output from the NN may be used to select the time and frequency DMRS allocation.

For example, as illustrated at 1008, the UE and the gNB may calculate the input features for the time/frequency NN for Period 0, and may use the NN output (e.g., in addition to other parameters/factors) for deciding on the DMRS configuration for Period 1.

Similarly, as illustrated at 1010, the UE and the gNB may calculate the input features for the time/frequency NN for Period 1, and may use the NN output (e.g., in addition to other parameters/factors) for deciding on the DMRS configuration for Period 2. Similarly, as illustrated at 1012, the UE and the gNB may calculate the input features for the time/frequency NN for Period 2, and may use the NN output (e.g., in addition to other parameters/factors) for deciding on the DMRS configuration for Period 3. This process of dynamic, NN-based DMRS resource allocation/configuration may continue for a plurality of periods.

By using similar/same ML models (e.g., NNs) at the UE and NW-side, both sides should stay in sync regarding the dynamic DMRS resource allocation used for any particular period.

As described herein, channel aware DMRS resource allocation proposed herein may allow for matching of DMRS density to the channel conditions/coherence, which may improve capacity and coverage by improving channel estimation (e.g., by increasing DMRS density when channel conditions dictate) and increasing throughput (e.g., by allowing more data REs when channel conditions allow for less dense DMRS).

Example Operations

Figure 11:
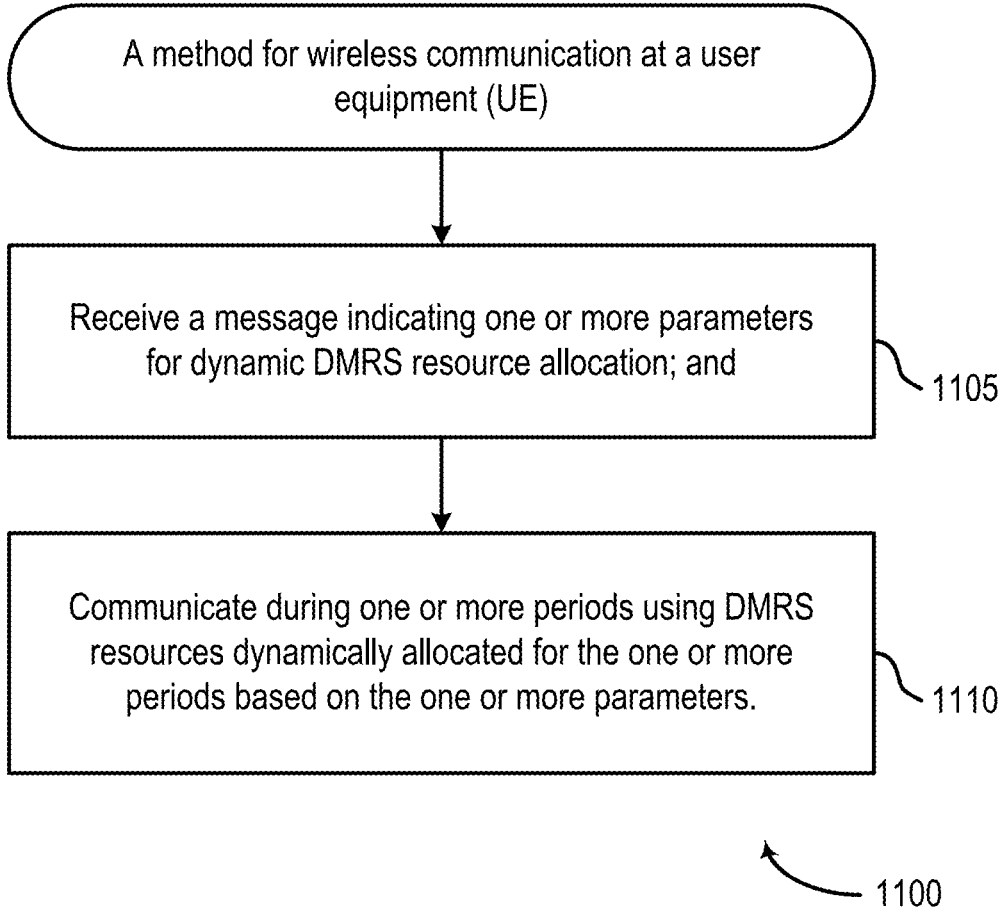
FIG. 11 depicts a method for wireless communications.

FIG. 11 shows an example of a method 1100 of wireless communication at a user equipment (UE), such as a UE 104 of FIGS. 1 and 3.

Method 1100 begins at step 1105 with receiving a message indicating one or more parameters for dynamic DMRS resource allocation. In some cases, the operations of this step refer to, or may be performed by, circuitry for receiving and/or code for receiving as described with reference to FIG. 13.

Method 1100 then proceeds to step 1110 with communicating during one or more periods using DMRS resources dynamically allocated for the one or more periods based on the one or more parameters. In some cases, the operations of this step refer to, or may be performed by, circuitry for communicating and/or code for communicating as described with reference to FIG. 13.

In some aspects, the method 1100 further includes transmitting signaling indicating a capability of the UE to support dynamic demodulation reference signal (DMRS) resource allocation, wherein the message is received in response to the signaling. In some cases, the operations of this step refer to, or may be performed by, circuitry for transmitting and/or code for transmitting as described with reference to FIG. 13.

In some aspects, the message acknowledges the signaling.

In some aspects, the signaling comprises uplink control information (UCI).

In some aspects, the message is received prior to establishing a radio resource control (RRC) connection with a network entity.

In some aspects, the communicating during the one or more periods comprises, after establishing the RRC connection with the network entity: receiving DMRS at time and frequency locations determined based on the one or more parameters; and processing data, transmitted from the network entity, in the one or more periods using the received DMRS.

In some aspects, the processing comprises performing channel estimation based on the received DMRS.

In some aspects, the one or more parameters indicate at least one of: a periodicity for changing the DMRS resource allocation; a set of possible DMRS configurations, comprising at least one of a set of possible DMRS time configurations, a set of possible DMRS frequency configurations, or a set of possible DMRS time and frequency configurations; or a default DMRS configuration for a first period of the one or more periods.

In some aspects, the one or more parameters indicate decision rules for time and frequency DMRS allocations.

In some aspects, the method 1100 further includes measuring an average time and frequency correlation for a first period of the one or more periods. In some cases, the operations of this step refer to, or may be performed by, circuitry for measuring and/or code for measuring as described with reference to FIG. 13.

In some aspects, the method 1100 further includes selecting, from the set of possible DMRS configurations, a DMRS configuration for a second period of the one or more periods, based on at least one of the average time and frequency correlation or the decision rules. In some cases, the operations of this step refer to, or may be performed by, circuitry for selecting and/or code for selecting as described with reference to FIG. 13.

In some aspects, the one or more parameters comprise at least one of: a time domain periodicity for changing the DMRS resource allocation; a frequency domain periodicity for changing the DMRS resource allocation; or a set of possible DMRS configurations, comprising at least one of a set of possible DMRS time configurations, a set of possible DMRS frequency configurations, or a set of possible DMRS time and frequency configurations.

In some aspects, the one or more parameters comprise at least one of: neural network (NN) coefficients for at least a first NN of a set of NNs; a set of features for at least the first NN; or one or more indices associated with at least the first NN.

In some aspects, the method 1100 further includes calculating features for the first NN for a first period of the one or more periods. In some cases, the operations of this step refer to, or may be performed by, circuitry for calculating and/or code for calculating as described with reference to FIG. 13.

In some aspects, the method 1100 further includes selecting, from the set of possible DMRS configurations, a DMRS configuration for a second period of the one or more periods, based on the first NN and the calculated features for the first period. In some cases, the operations of this step refer to, or may be performed by, circuitry for selecting and/or code for selecting as described with reference to FIG. 13.

In some aspects, the first NN generates, as output, time and frequency resources for the dynamic DMRS resource allocation.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Figure 12:
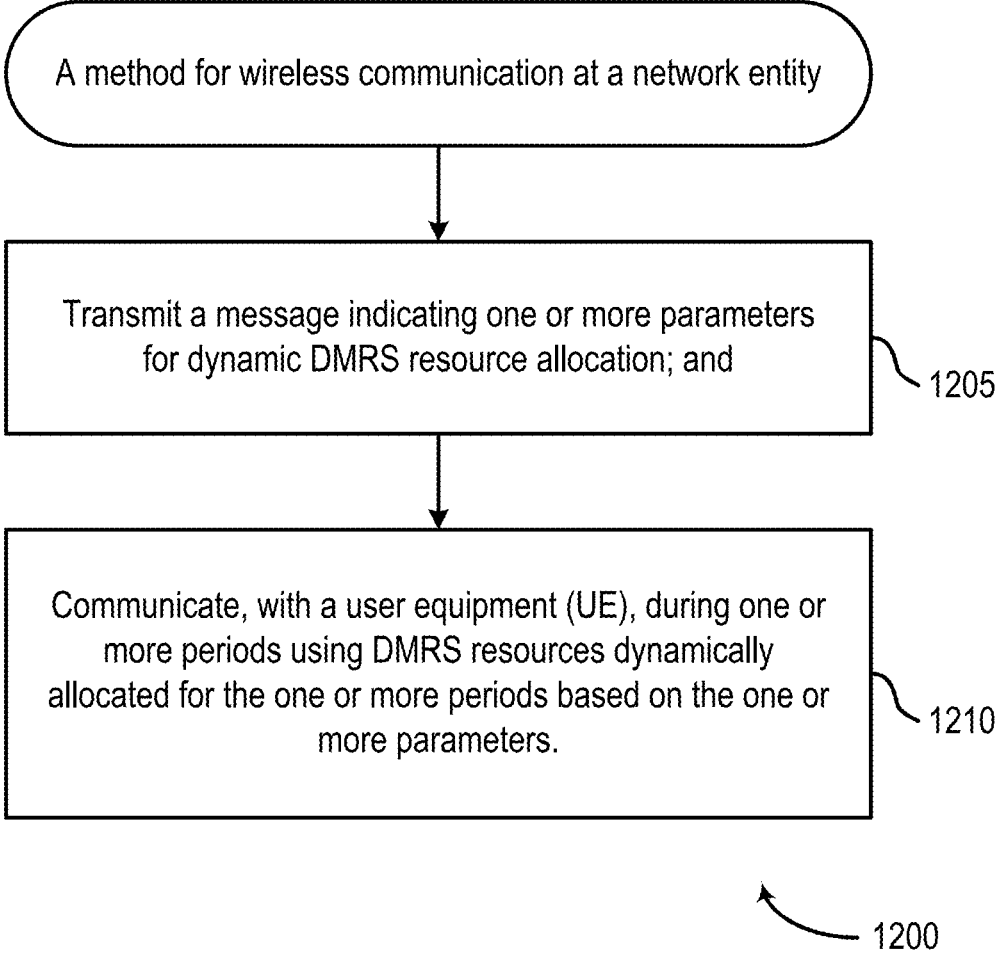
FIG. 12 depicts a method for wireless communications.

FIG. 12 shows an example of a method 1200 of wireless communication at a network entity, such as a BS 102 of FIGS. 1 and 3, or a disaggregated base station as discussed with respect to FIG. 2.

Method 1200 begins at step 1205 with transmitting a message indicating one or more parameters for dynamic DMRS resource allocation. In some cases, the operations of this step refer to, or may be performed by, circuitry for transmitting and/or code for transmitting as described with reference to FIG. 13.

Method 1200 then proceeds to step 1210 with communicating, with a user equipment (UE), during one or more periods using DMRS resources dynamically allocated for the one or more periods based on the one or more parameters. In some cases, the operations of this step refer to, or may be performed by, circuitry for communicating and/or code for communicating as described with reference to FIG. 13.

In some aspects, the method 1200 further includes receiving signaling indicating a capability of the UE to support dynamic demodulation reference signal (DMRS) resource allocation, wherein the message is received in response to the signaling. In some cases, the operations of this step refer to, or may be performed by, circuitry for receiving and/or code for receiving as described with reference to FIG. 13.

In some aspects, the message acknowledges the signaling.

In some aspects, the signaling comprises uplink control information (UCI).

In some aspects, the message is transmitted prior to the UE establishing a radio resource control (RRC) connection with the network entity.

In some aspects, the communicating during the one or more periods comprises, after the UE establishes the RRC connection with the network entity: transmitting DMRS at time and frequency locations determined based on the one or more parameters; and transmitting data in the one or more periods with the DMRS.

In some aspects, the communicating during the one or more periods comprises, after the UE establishes the RRC connection with the network entity: receiving DMRS at time and frequency locations determined based on the one or more parameters; and processing data received in the one or more periods based on the received DMRS.

In some aspects, the one or more parameters indicate at least one of: a periodicity for changing the DMRS resource allocation; a set of possible DMRS configurations, comprising at least one of a set of possible DMRS time configurations, a set of possible DMRS frequency configurations, or a set of possible DMRS time and frequency configurations; or a default DMRS configuration for a first period of the one or more periods.

In some aspects, the one or more parameters indicate decision rules for time and frequency DMRS allocations.

In some aspects, the method 1200 further includes measuring an average time and frequency correlation for a first period of the one or more periods. In some cases, the operations of this step refer to, or may be performed by, circuitry for measuring and/or code for measuring as described with reference to FIG. 13.

In some aspects, the method 1200 further includes selecting, from the set of possible DMRS configurations, a DMRS configuration for a second period of the one or more periods, based on at least one of the average time and frequency correlation or the decision rules. In some cases, the operations of this step refer to, or may be performed by, circuitry for selecting and/or code for selecting as described with reference to FIG. 13.

In some aspects, the one or more parameters comprise at least one of: a time domain periodicity for changing the DMRS resource allocation; a frequency domain periodicity for changing the DMRS resource allocation; or a set of possible DMRS configurations, comprising at least one of a set of possible DMRS time configurations, a set of possible DMRS frequency configurations, or a set of possible DMRS time and frequency configurations.

In some aspects, the one or more parameters comprise at least one of: neural network (NN) coefficients for at least a first NN of a set of NNs; a set of features for at least the first NN; or one or more indices associated with at least the first NN.

In some aspects, the method 1200 further includes calculating features for the first NN for a first period of the one or more periods. In some cases, the operations of this step refer to, or may be performed by, circuitry for calculating and/or code for calculating as described with reference to FIG. 13.

In some aspects, the method 1200 further includes selecting, from the set of possible DMRS configurations, a DMRS configuration for a second period of the one or more periods, based on the first NN and the calculated features for the first period. In some cases, the operations of this step refer to, or may be performed by, circuitry for selecting and/or code for selecting as described with reference to FIG. 13.

In some aspects, the first NN generates, as output, time and frequency resources for the dynamic DMRS resource allocation.

In one aspect, method 1200, or any aspect related to it, may be performed by an apparatus, such as communications device 1300 of FIG. 13, which includes various components operable, configured, or adapted to perform the method 1200. Communications device 1300 is described below in further detail.

Note that FIG. 12 is just one example of a method, and other methods including fewer, additional, or alternative steps are possible consistent with this disclosure.

Example Communications Device(s)

FIG. 13 depicts aspects of an example communications device 1300. In some aspects, communications device 1300 is a user equipment, such as UE 104 described above with respect to FIGS. 1 and 3. In some aspects, communications device 1300 is a network entity, such as BS 102 of FIGS. 1 and 3, or a disaggregated base station as discussed with respect to FIG. 2.

The communications device 1300 includes a processing system 1305 coupled to the transceiver 1385 (e.g., a transmitter and/or a receiver). In some aspects (e.g., when communications device 1300 is a network entity), processing system 1305 may be coupled to a network interface 1395 that is configured to obtain and send signals for the communications device 1300 via communication link(s), such as a backhaul link, midhaul link, and/or fronthaul link as described herein, such as with respect to FIG. 2. The transceiver 1385 is configured to transmit and receive signals for the communications device 1300 via the antenna 1390, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1345 via a bus 1380. In certain aspects, the computer-readable medium/memory 1345 is configured to store instructions (e.g., computer-executable code) that when executed by the one or more processors 1310, cause the one or more processors 1310 to perform the method 1100 described with respect to FIG. 11, or any aspect related to it; and the method 1200 described with respect to FIG. 12, or any aspect related to it. Note that reference to a processor performing a function of communications device 1300 may include one or more processors 1310 performing that function of communications device 1300.

In the depicted example, computer-readable medium/memory 1345 stores code (e.g., executable instructions), such as code for receiving 1350, code for communicating 1355, code for transmitting 1360, code for measuring 1365, code for selecting 1370, and code for calculating 1375. Processing of the code for receiving 1350, code for communicating 1355, code for transmitting 1360, code for measuring 1365, code for selecting 1370, and code for calculating 1375 may cause the communications device 1300 to perform the method 1100 described with respect to FIG. 11, or any aspect related to it; and the method 1200 described with respect to FIG. 12, or any aspect related to it.

The one or more processors 1310 include circuitry configured to implement (e.g., execute) the code stored in the computer-readable medium/memory 1345, including circuitry for receiving 1315, circuitry for communicating 1320, circuitry for transmitting 1325, circuitry for measuring 1330, circuitry for selecting 1335, and circuitry for calculating 1340. Processing with circuitry for receiving 1315, circuitry for communicating 1320, circuitry for transmitting 1325, circuitry for measuring 1330, circuitry for selecting 1335, and circuitry for calculating 1340 may cause the communications device 1300 to perform the method 1100 described with respect to FIG. 11, or any aspect related to it; and the method 1200 described with respect to FIG. 12, or any aspect related to it.

Various components of the communications device 1300 may provide means for performing the method 1100 described with respect to FIG. 11, or any aspect related to it; and the method 1200 described with respect to FIG. 12, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1385 and the antenna 1390 of the communications device 1300 in FIG. 13. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1385 and the antenna 1390 of the communications device 1300 in FIG. 13.

Example Clauses

Implementation examples are described in the following numbered clauses:

Clause 1: A method for wireless communication at a user equipment (UE), comprising: receiving a message indicating one or more parameters for dynamic DMRS resource allocation; and communicating during one or more periods using DMRS resources dynamically allocated for the one or more periods based on the one or more parameters.

Clause 2: The method of Clause 1, further comprising transmitting signaling indicating a capability of the UE to support dynamic demodulation reference signal (DMRS) resource allocation, wherein the message is received in response to the signaling.

Clause 3: The method of Clause 2, wherein the message acknowledges the signaling.

Clause 4: The method of Clause 2, wherein the signaling comprises uplink control information (UCI).

Clause 5: The method of any one of Clauses 1-4, wherein the message is received prior to establishing a radio resource control (RRC) connection with a network entity.

Clause 6: The method of Clause 5, wherein the communicating during the one or more periods comprises, after establishing the RRC connection with the network entity: receiving DMRS at time and frequency locations determined based on the one or more parameters; and processing data, transmitted from the network entity, in the one or more periods using the received DMRS.

Clause 7: The method of Clause 6, wherein the processing comprises performing channel estimation based on the received DMRS.

Clause 8: The method of any one of Clauses 1-7, wherein the one or more parameters indicate at least one of: a periodicity for changing the DMRS resource allocation; a set of possible DMRS configurations, comprising at least one of a set of possible DMRS time configurations, a set of possible DMRS frequency configurations, or a set of possible DMRS time and frequency configurations; or a default DMRS configuration for a first period of the one or more periods.

Clause 9: The method of Clause 8, wherein the one or more parameters indicate decision rules for time and frequency DMRS allocations.

Clause 10: The method of Clause 9, further comprising: measuring an average time and frequency correlation for a first period of the one or more periods; and selecting, from the set of possible DMRS configurations, a DMRS configuration for a second period of the one or more periods, based on at least one of the average time and frequency correlation or the decision rules.

Clause 11: The method of any one of Clauses 1-10, wherein the one or more parameters comprise at least one of: a time domain periodicity for changing the DMRS resource allocation; a frequency domain periodicity for changing the DMRS resource allocation; or a set of possible DMRS configurations, comprising at least one of a set of possible DMRS time configurations, a set of possible DMRS frequency configurations, or a set of possible DMRS time and frequency configurations.

Clause 12: The method of Clause 11, wherein the one or more parameters comprise at least one of: neural network (NN) coefficients for at least a first NN of a set of NNs; a set of features for at least the first NN; or one or more indices associated with at least the first NN.

Clause 13: The method of Clause 12, further comprising: calculating features for the first NN for a first period of the one or more periods; and selecting, from the set of possible DMRS configurations, a DMRS configuration for a second period of the one or more periods, based on the first NN and the calculated features for the first period.

Clause 14: The method of Clause 12, wherein the first NN generates, as output, time and frequency resources for the dynamic DMRS resource allocation.

Clause 15: A method for wireless communication at a network entity, comprising: transmitting a message indicating one or more parameters for dynamic DMRS resource allocation; and communicating, with a user equipment (UE), during one or more periods using DMRS resources dynamically allocated for the one or more periods based on the one or more parameters.

Clause 16: The method of Clause 15, further comprising receiving signaling indicating a capability of the UE to support dynamic demodulation reference signal (DMRS) resource allocation, wherein the message is received in response to the signaling.

Clause 17: The method of Clause 16, wherein the message acknowledges the signaling.

Clause 18: The method of Clause 16, wherein the signaling comprises uplink control information (UCI).

Clause 19: The method of any one of Clauses 15-18, wherein the message is transmitted prior to the UE establishing a radio resource control (RRC) connection with the network entity.

Clause 20: The method of Clause 19, wherein the communicating during the one or more periods comprises, after the UE establishes the RRC connection with the network entity: transmitting DMRS at time and frequency locations determined based on the one or more parameters; and transmitting data in the one or more periods with the DMRS.

Clause 21: The method of Clause 19, wherein the communicating during the one or more periods comprises, after the UE establishes the RRC connection with the network entity: receiving DMRS at time and frequency locations determined based on the one or more parameters; and processing data received in the one or more periods based on the received DMRS.

Clause 22: The method of any one of Clauses 15-21, wherein the one or more parameters indicate at least one of: a periodicity for changing the DMRS resource allocation; a set of possible DMRS configurations, comprising at least one of a set of possible DMRS time configurations, a set of possible DMRS frequency configurations, or a set of possible DMRS time and frequency configurations; or a default DMRS configuration for a first period of the one or more periods.

Clause 23: The method of Clause 22, wherein the one or more parameters indicate decision rules for time and frequency DMRS allocations.

Clause 24: The method of Clause 23, further comprising: measuring an average time and frequency correlation for a first period of the one or more periods; and selecting, from the set of possible DMRS configurations, a DMRS configuration for a second period of the one or more periods, based on at least one of the average time and frequency correlation or the decision rules.

Clause 25: The method of any one of Clauses 15-24, wherein the one or more parameters comprise at least one of: a time domain periodicity for changing the DMRS resource allocation; a frequency domain periodicity for changing the DMRS resource allocation; or a set of possible DMRS configurations, comprising at least one of a set of possible DMRS time configurations, a set of possible DMRS frequency configurations, or a set of possible DMRS time and frequency configurations.

Clause 26: The method of Clause 25, wherein the one or more parameters comprise at least one of: neural network (NN) coefficients for at least a first NN of a set of NNs; a set of features for at least the first NN; or one or more indices associated with at least the first NN.

Clause 27: The method of Clause 26, further comprising: calculating features for the first NN for a first period of the one or more periods; and selecting, from the set of possible DMRS configurations, a DMRS configuration for a second period of the one or more periods, based on the first NN and the calculated features for the first period.

Clause 28: The method of Clause 26, wherein the first NN generates, as output, time and frequency resources for the dynamic DMRS resource allocation.

Clause 29: The method of any one of clauses 1-14, further comprising dynamically selecting, at the UE, the DMRS resources used for communicating during the one or more periods, based on the one or more parameters.

Clause 30: The method of any one of clauses 15-28, further comprising dynamically selecting, at the network entity, the DMRS resources used for communicating during the one or more periods, based on the one or more parameters.

Clause 31: An apparatus, comprising: a memory comprising executable instructions; and a processor configured to execute the executable instructions and cause the apparatus to perform a method in accordance with any one of Clauses 1-30.

Clause 32: An apparatus, comprising means for performing a method in accordance with any one of Clauses 1-30.

Clause 33: A non-transitory computer-readable medium comprising executable instructions that, when executed by a processor of an apparatus, cause the apparatus to perform a method in accordance with any one of Clauses 1-30.

Clause 34: A computer program product embodied on a computer-readable storage medium comprising code for performing a method in accordance with any one of Clauses 1-30.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising:
   at least one memory comprising computer-executable instructions; and
   one or more processors configured to execute the computer-executable instructions and cause the UE to:
      receive a message indicating one or more parameters for dynamic demodulation reference signal (DMRS) resource allocation;
      dynamically allocate DMRS resources for communicating during one or more periods based on the one or more parameters; and
      communicate during the one or more periods using the DMRS resources dynamically allocated for the one or more periods based on the one or more parameters.

2. The apparatus of claim 1, wherein the one or more parameters indicate at least one of:
   a periodicity for changing the DMRS resource allocation;
   a set of possible DMRS configurations, comprising at least one of a set of possible DMRS time configurations, a set of possible DMRS frequency configurations, or a set of possible DMRS time and frequency configurations; or
   a default DMRS configuration for a first period of the one or more periods.

3. The apparatus of claim 2, wherein the one or more parameters indicate decision rules for time and frequency DMRS allocations.

4. The apparatus of claim 3, wherein the one or more processors are further configured to cause the UE to:
   measure an average time and frequency correlation for a first period of the one or more periods; and
   select, from the set of possible DMRS configurations, a DMRS configuration for a second period of the one or more periods, based on at least one of the average time and frequency correlation or the decision rules.

5. The apparatus of claim 1, wherein the one or more parameters comprise at least one of:
   a time domain periodicity for changing the DMRS resource allocation;

a frequency domain periodicity for changing the DMRS resource allocation; or a set of possible DMRS configurations, comprising at least one of a set of possible DMRS time configurations, a set of possible DMRS frequency configurations, or a set of possible DMRS time and frequency configurations.

6. The apparatus of claim 5, wherein the one or more parameters comprise at least one of:

neural network (NN) coefficients for at least a first NN of a set of NNs;

a set of features for at least the first NN; or one or more indices associated with at least the first NN.

7. The apparatus of claim 6, wherein the one or more processors are further configured to cause the UE to:

calculate features for the first NN for a first period of the one or more periods; and select, from the set of possible DMRS configurations, a DMRS configuration for a second period of the one or more periods, based on the first NN and the calculated features for the first period.

8. The apparatus of claim 6, wherein the first NN generates, as output, time and frequency resources for the dynamic DMRS resource allocation.

9. The apparatus of claim 1, wherein the one or more processors are further configured to cause the UE to transmit signaling indicating a capability of the UE to support dynamic demodulation reference signal (DMRS) resource allocation, wherein the message is received in response to the signaling.

10. The apparatus of claim 9, wherein the message acknowledges the signaling.

11. The apparatus of claim 9, wherein the signaling comprises uplink control information (UCI).

12. The apparatus of claim 1, wherein the message is received prior to establishment of a radio resource control (RRC) connection with a network entity.

13. The apparatus of claim 12, wherein in order to communicate during the one or more periods, the one or more processors are further configured to cause the UE to:

receive DMRS at time and frequency locations determined based on the one or more parameters; and process data, received from the network entity, in the one or more periods using the received DMRS after establishing the RRC connection with the network entity.

14. The apparatus of claim 13, wherein in order to process data, the one or more processors are further configured to cause the UE to perform channel estimation based on the received DMRS.

15. A method for wireless communication at a user equipment (UE), comprising:

receiving a message indicating one or more parameters for dynamic demodulation reference signal (DMRS) resource allocation;

dynamically allocating DMRS resources for communicating during one or more periods based on the one or more parameters; and communicating during the one or more periods using the DMRS resources dynamically allocated for the one or more periods based on the one or more parameters.

* * * * *